United States Patent
Medina

(10) Patent No.: US 7,665,334 B2
(45) Date of Patent: Feb. 23, 2010

(54) OUTBOARD MOTOR LOWER-UNIT LOCK

(76) Inventor: Pedro Medina, 1080 NW. 1 Ct., Hallandale Bch, FL (US) 33009

(*) Notice: Subject to any disclaimer, the term of this patent is extended or adjusted under 35 U.S.C. 154(b) by 255 days.

(21) Appl. No.: 11/982,661

(22) Filed: Nov. 5, 2007

(65) Prior Publication Data

US 2009/0113960 A1 May 7, 2009

(51) Int. Cl.
E05B 65/00 (2006.01)
F16B 41/00 (2006.01)
B63H 20/32 (2006.01)

(52) U.S. Cl. ............ 70/57; 70/14; 70/229; 70/DIG. 57; 440/76; 440/78

(58) Field of Classification Search ............ 70/14, 70/58, 229, 232, 57, 179, 230, DIG. 57; 440/49, 440/76, 78
See application file for complete search history.

(56) References Cited

U.S. PATENT DOCUMENTS

| | | | | |
|---|---|---|---|---|
| 4,280,348 A * | 7/1981 | Teston | | 70/232 |
| 4,557,458 A * | 12/1985 | Vahlberg et al. | | 70/232 |
| 4,640,106 A * | 2/1987 | Derman | | 70/14 |
| 4,742,702 A * | 5/1988 | Swertz | | 70/232 |
| D297,913 S | 10/1988 | Barnes | | |
| 5,184,488 A | 2/1993 | Sandlin | | |
| 5,392,621 A * | 2/1995 | Dunnigan | | 70/232 |
| 5,469,721 A | 11/1995 | Pyle | | |
| 5,469,726 A * | 11/1995 | Rushing et al. | | 70/232 |
| 6,305,107 B1 * | 10/2001 | Parenti | | 70/232 |
| 6,322,308 B1 * | 11/2001 | Grant | | 70/232 |
| 6,726,515 B1 | 4/2004 | DeMange | | |
| 6,910,355 B2 * | 6/2005 | Swanson | | 70/232 |
| 7,278,893 B1 | 10/2007 | Frantz | | |
| 2003/0019259 A1 * | 1/2003 | Nicodemus et al. | | 70/232 |

* cited by examiner

Primary Examiner—Peter M Cuomo
Assistant Examiner—Christopher Boswell

(57) ABSTRACT

An outboard motor lower-unit lock has a key, a locking pin assembly and a shaft. To install the lock, a user drills a shaft hole the same diameter as the shaft through both sides of a housing unit below an access hole of the housing unit. The shaft is inserted in the shaft hole, and oriented so that a threaded hole in the center of the shaft can receive a threaded pin section of the locking pin. The locking pin receives the key. The key is tightened. Finally, the user removes the key allowing the locking pin to rotate around and below the shaft, thereby obstructing a bolt securing the lower-unit to the housing unit, and preventing the unauthorized removal of the lower-unit.

10 Claims, 5 Drawing Sheets

OUTBOARD MOTOR LOWER-UNIT LOCK

BACKGROUND OF THE INVENTION

1. Introduction

Boat motors are expensive, but certain factors limit their appeal to thieves. For example, boat motors can be difficult to detach from the boat requiring significant time and effort. Also, boat motors can be heavy, requiring two or more people to transport them. Finally, motors might be somewhat distinctive, bearing serial numbers or other indicia. Consequently, thieves have found a more favorable risk to reward ratio in just stealing the parts of the motor.

Most outboard motors have three sections; a power-head, a housing-unit and a lower-unit. The mid housing-unit is where the engine resides. The lighter and smaller lower-unit primarily features a foot portion having a trim tab, a skeg and an attached propeller.

The lower-unit of the motor is particularly attractive to thieves. The lower-unit is attached to the housing unit by several bolts. These bolts are easily removed with a socket wrench, and are outside the motor. Additionally, a single bolt, inside the housing unit and only accessible via an access hole in the housing, also secures the lower unit to the housing unit. A thief must remove a cap on the housing unit, and then use a socket wrench with an extension or extender arm to reach and remove the final nut.

One person on foot can carry away the lower-unit. Further, the lower-unit has substantial resale value. Presently, the cost of a new lower-unit varies between $2,000.00 and $2,800.00. Finally, the lower unit is difficult to trace. On the secondary market it is difficult to differentiate between merely used lower-units and used, but stolen lower-units.

An owner can take several steps to protect his motor from losing its lower unit. A locking mechanism is one such step. However, the lock must not interfere with the operation of the motor, and it must be convenient for the owner to remove the lower-unit to service or replace it.

2. Field of the Invention

The present invention relates to a lock for securing the lower-unit of an outboard motor to the housing or midsection of the outboard motor.

3. Description of the Prior Art

Engine security devices are disclosed in U.S. patents. U.S. Pat. No. 6,726,515 B1, to DeMange teaches a dead bolt for preventing the unauthorized removal of an outboard motor from a boat. DeMange's lock is installed between the transom of a boat and a clamp of an outboard motor, thereby protecting the clamp, but still allowing other parts of the motor to be easily removed.

U.S. Pat. No. 5,184,488 to Sandlin teaches a marine outdrive locking system. Sandlin's lock primarily protects the propeller, and must be removed in order for the motor to be used.

U.S. Pat. No. 5,469,721 to Pyle teaches a boat propeller case and lock. Here again, the case must be removed prior to operating the boat.

U.S. Pat. No. D297,913 to Barnes is a design patent directed toward an ornamental design for a lock for securing an outboard engine to a boat transom.

BRIEF SUMMARY OF THE INVENTION

It is an object of the present invention to prevent the unauthorized removal of the lower-unit of an outboard motor.

Another object of the present invention is to provide a lock that will allow the outboard motor to function with the lock attached.

A further object of the present invention is to provide a lock that can be easily removed to allow service or replacement of the lower-unit of an outboard motor.

A further object of the present invention is to provide a lock that requires minor modification of the housing-unit of an outboard motor. What modification is necessary is provided by an installation kit.

These and other objects of the invention are accomplished by providing an outboard motor lower-unit lock having a key, a locking pin assembly, and a shaft.

Other objects and further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWING

The present invention will be better understood from the detailed description given herein below and the accompanying drawings with which are given by way of illustration only.

DETAILED DESCRIPTION OF THE INVENTION

Figure 1:
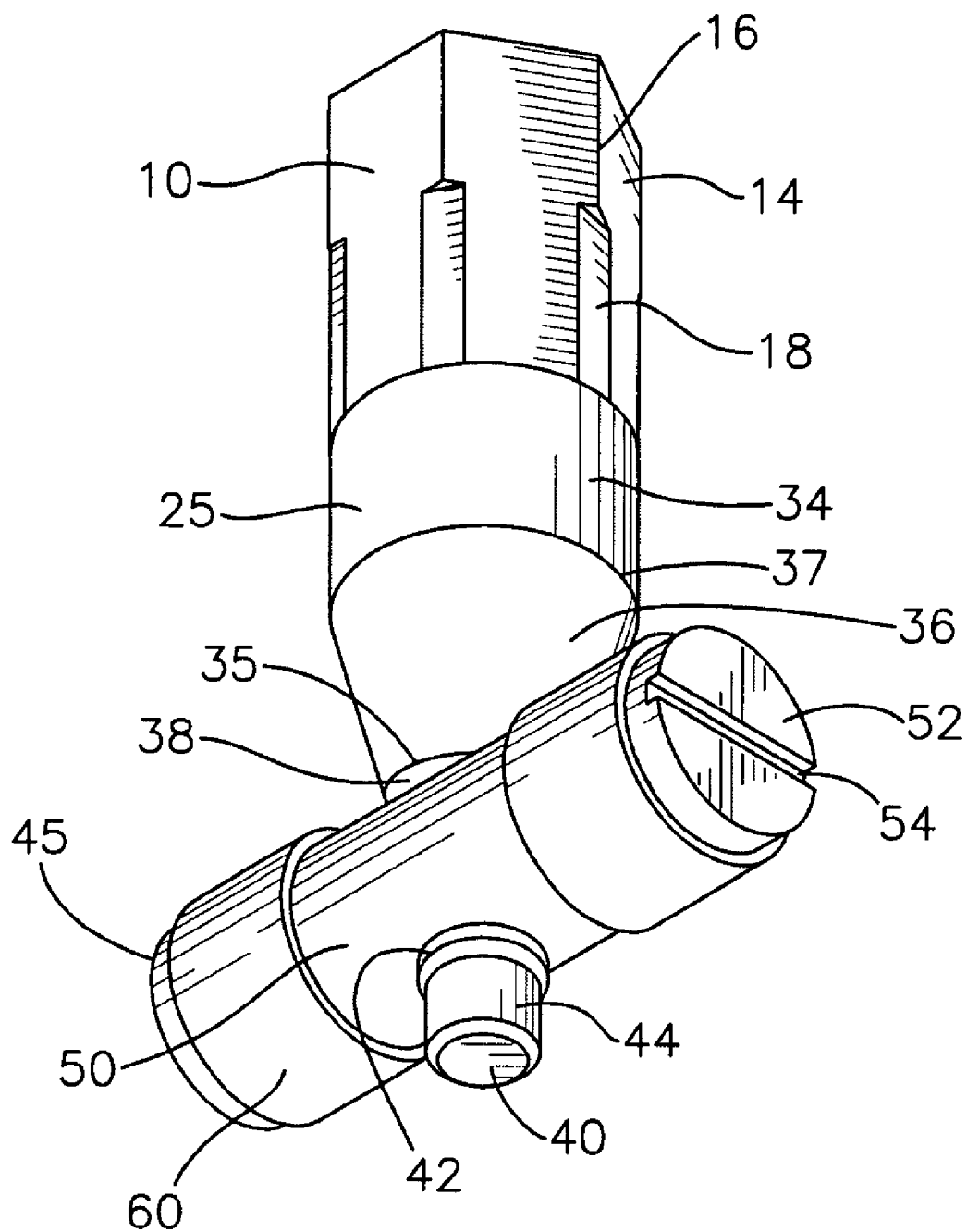
FIG. 1 is a perspective view of the outboard motor lower-unit lock of the present invention.

An outboard motor lower-unit lock is illustrated in FIG. 1. Here, the lock is assembled as it might appear when installed in an outboard motor. The lock has three major parts: a locking pin assembly 25, a shaft 45, and a key 10. In one preferred embodiment the key 10 is made of brass, and the shaft 45 and locking pin assembly 25 are made of stainless steel.

Figure 2A:
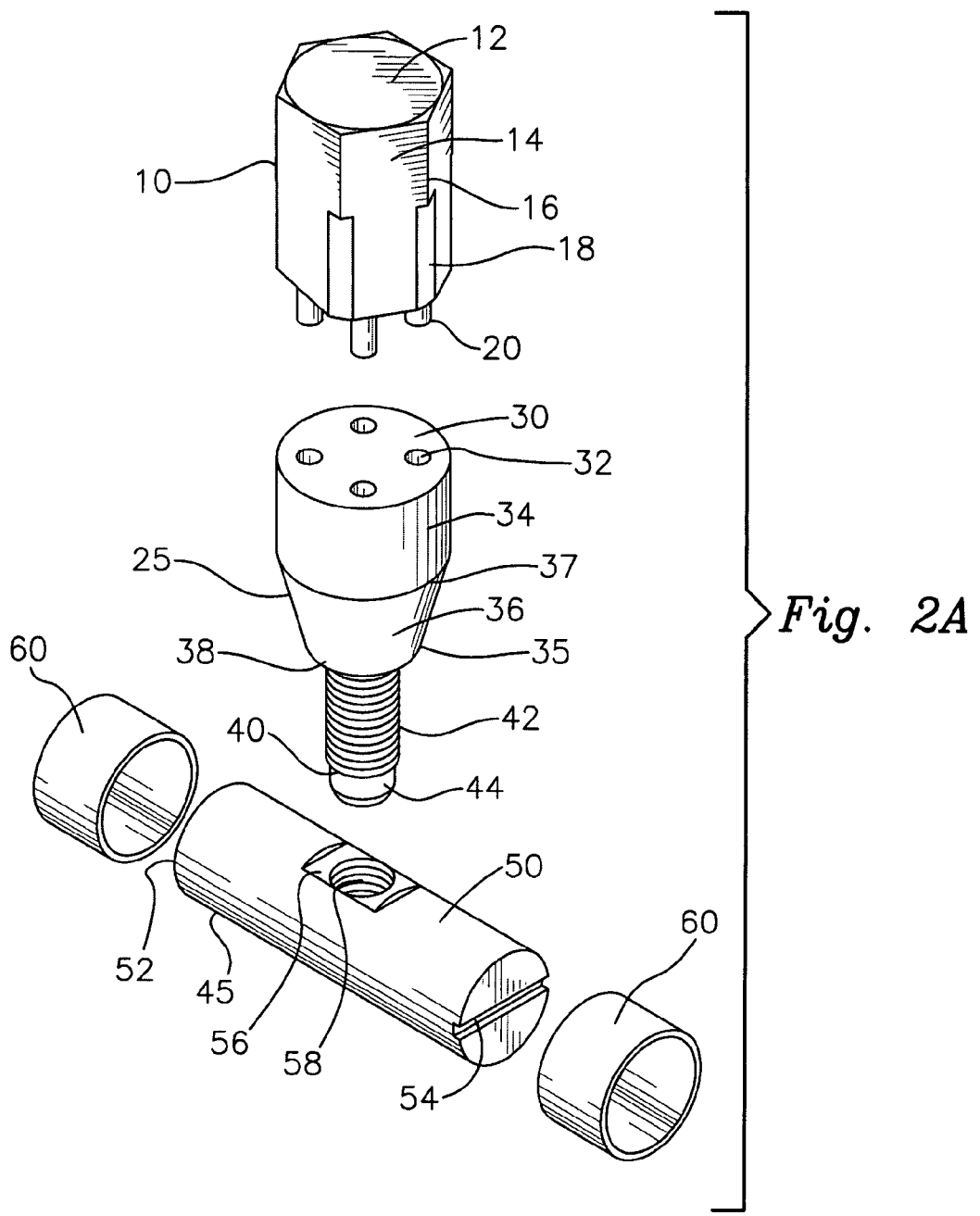
FIG. 2a is an exploded perspective view of the lower-unit lock, viewed from the key to the shaft, or what would be considered a downward view with respect to the orientation of a typical installation.

FIG. 2a provides an exploded perspective view of the lower-unit lock, viewed from the key 10 to the shaft 45, or what would be considered a downward view with respect to the orientation of a typical installation. This view illustrates a dowel receiving face 30 and a plurality of dowel holes 32 of the locking pin assembly 25. In one preferred embodiment there are four dowel holes 32, arranged in a square pattern. The dowel holes 32 are for receiving dowels 20 on the key 10.

The locking pin assembly 25 has cylindrical section 34 perpendicular to and abutting the dowel receiving face 30. A conical section 36, having narrow 35 and wide 37 ends, abuts the cylindrical section 34 at an end of the cylindrical section 34 opposite the dowel receiving face 30. The wide end 37 rests next to the cylindrical section 34. In one preferred embodiment, the conical section has a lip 38 at its narrow end 35. The surface of the lip 38 is parallel to the conical section 36, thereby having a conical shape itself. This lip 38, or straightening out of the conical section 36 allows a more secure fit of the locking pin assembly 25 to the shaft 45, as explained below.

Figure 2B:
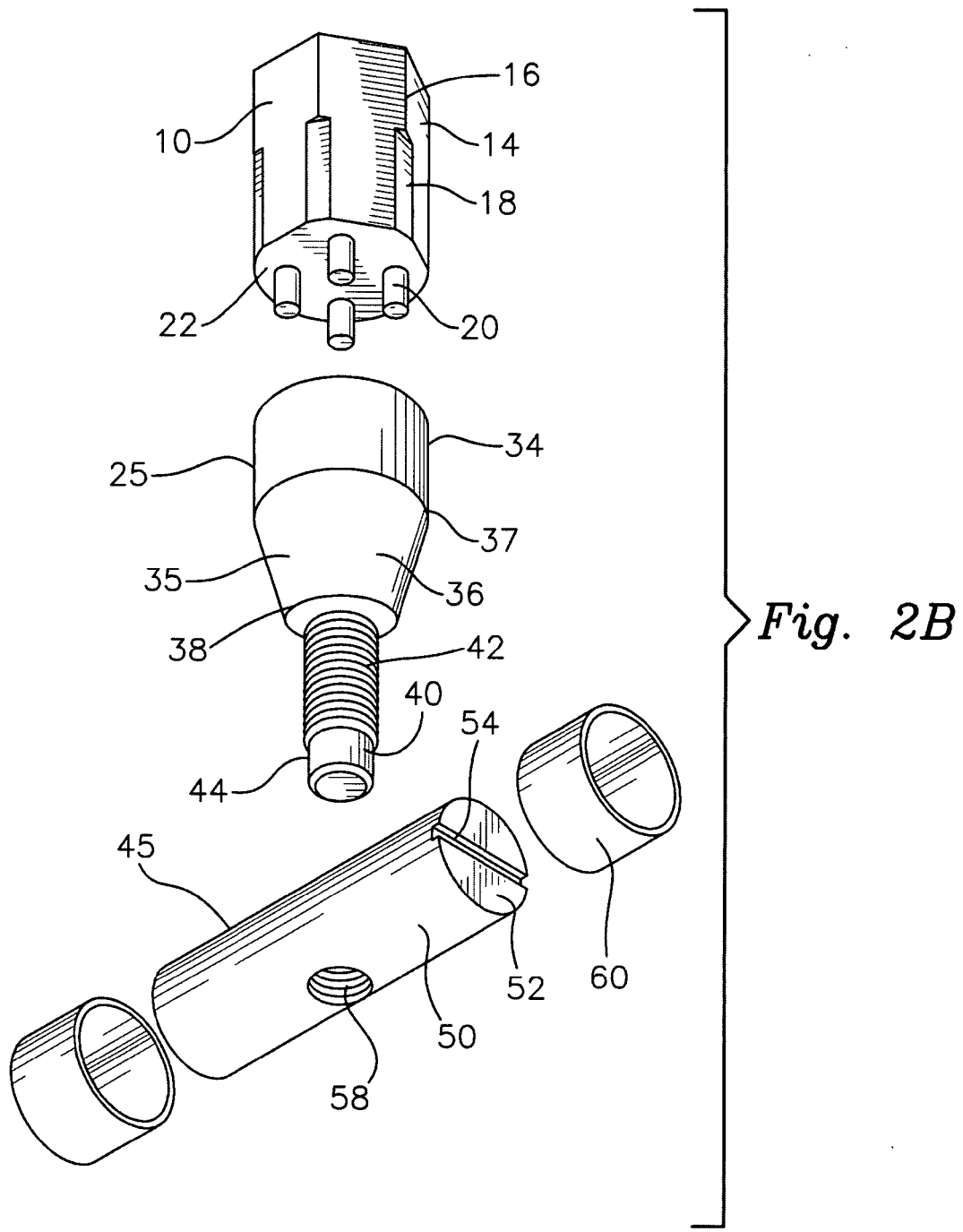
FIG. 2b is an exploded perspective view of the lower-unit lock, viewed from the shaft to the key, or what would be considered an upward view with respect to the orientation of a typical installation.

A pin 40 is at the narrow end 35 of the conical section. The pin 40 has a threaded section 42 proximal to the narrow end 35, and a smooth section 44 distal to the narrow end 35. These elements are illustrated in FIG. 2b, an exploded perspective view of the lower-unit lock, viewed from the shaft 45 to the key 10, or what would be considered an upward view with respect to the orientation of a typical installation.

A cylindrical shaft 45 has a shaft side 50 the length of the shaft 45. The ends of the shaft have end faces 52. An end face slot 54 is defined in at least on of the end faces 52. A threaded hole 58 for receiving the pin 40 centrally bisects the shaft 45. An interior plane 56 defined in the shaft side 50 surrounds the threaded hole 58. This interior plane 56 allows the lip 38 and the narrow end 35 of the conical section to be flush with the interior plane 56 when the pin 40 is fully inserted into the threaded hole 38, as explained above.

Figure 3:
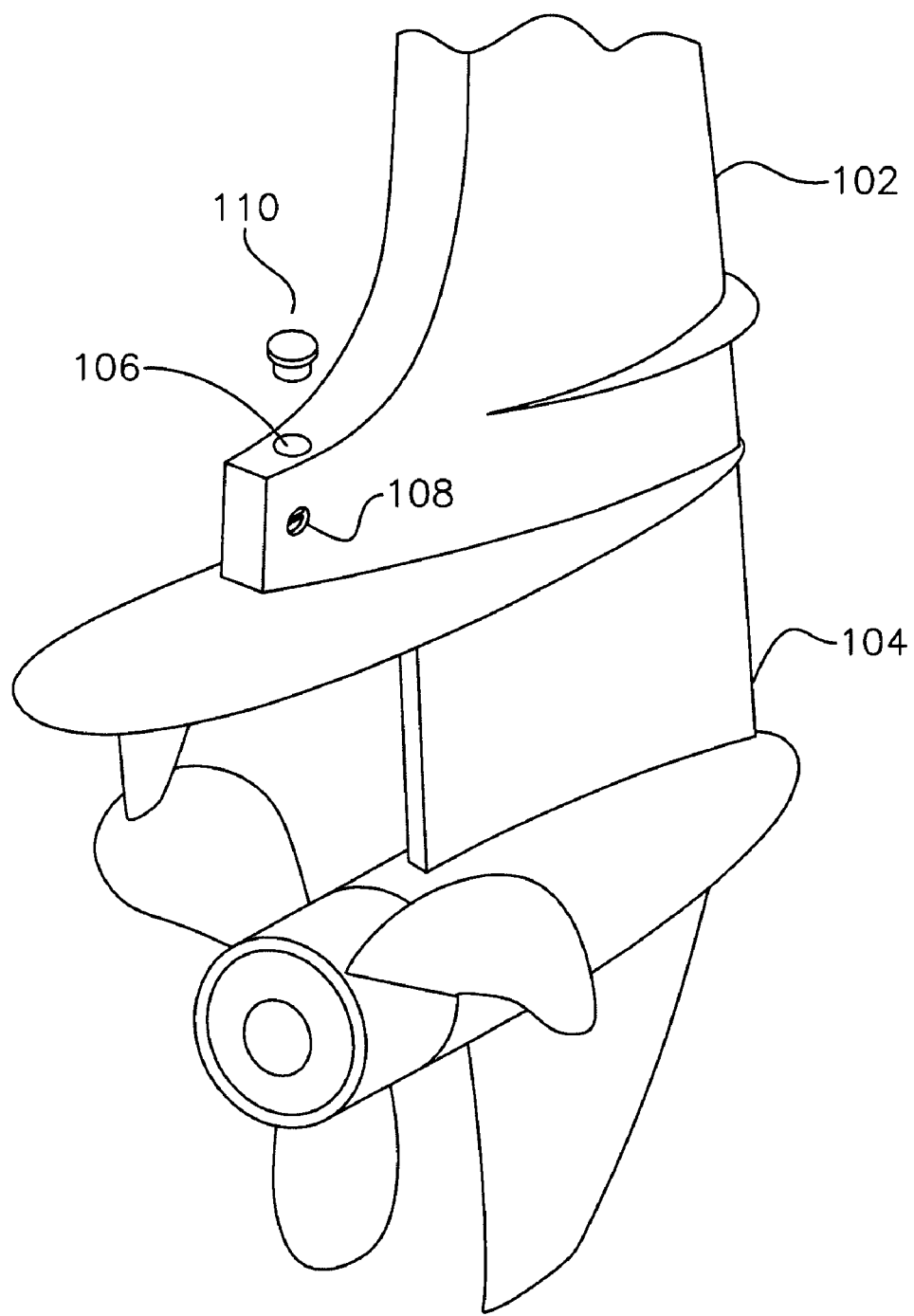
FIG. 3 is a view of the presently claimed invention illustrating its placement on an outboard motor.

FIG. 3 illustrates the placement of the presently claimed invention on an outboard motor. In one particular embodiment (with reference to FIGS. 1, 2a, and 2b), a bushing 60, such as one made of DELRON or similar polymer known by one skilled in the art, is placed on either side of the interior plane 56 of the cylindrical shaft 45. The bushing 60 separates the shaft side 50 from the interior of shaft holes 108 drilled in a housing 102 of an outboard motor 120.

The key 10 has an exterior face 12; in a preferred embodiment this face has a hexagonal shape, whereby it can receive a socket wrench. A plurality of planar major sides 14, are positioned perpendicular and proximal to the exterior face 12. In a preferred embodiment, there are six major sides 14, corresponding to the hexagonal shape of the exterior face 12.

The abutment of the major sides 14 defines a plurality of edges 16. These edges 16 are generally half the length of the major sides 14. A plurality of planar minor sides 18, generally half the length of the major sides 14, are distal to the exterior face 12, and centered next to the edges 16. The minor sides 18 alternate, thereby connecting the major sides 14. In a preferred embodiment, there are six edges 16 and six minor sides 14.

The key 10 also has an interior face 22 perpendicular to the major 14 and minor 18 sides and parallel to the exterior face 12. The interior face 22 has a plurality of dowels 20. In one preferred embodiment, there are four dowel 20, arranged in a square pattern. The dowel holes 32 are for receiving dowels 20 on the key 10. When the dowels 20 are inserted into the dowel holes 32, the interior face 22 is flush with the dowel receiving face 30.

Figure 4:
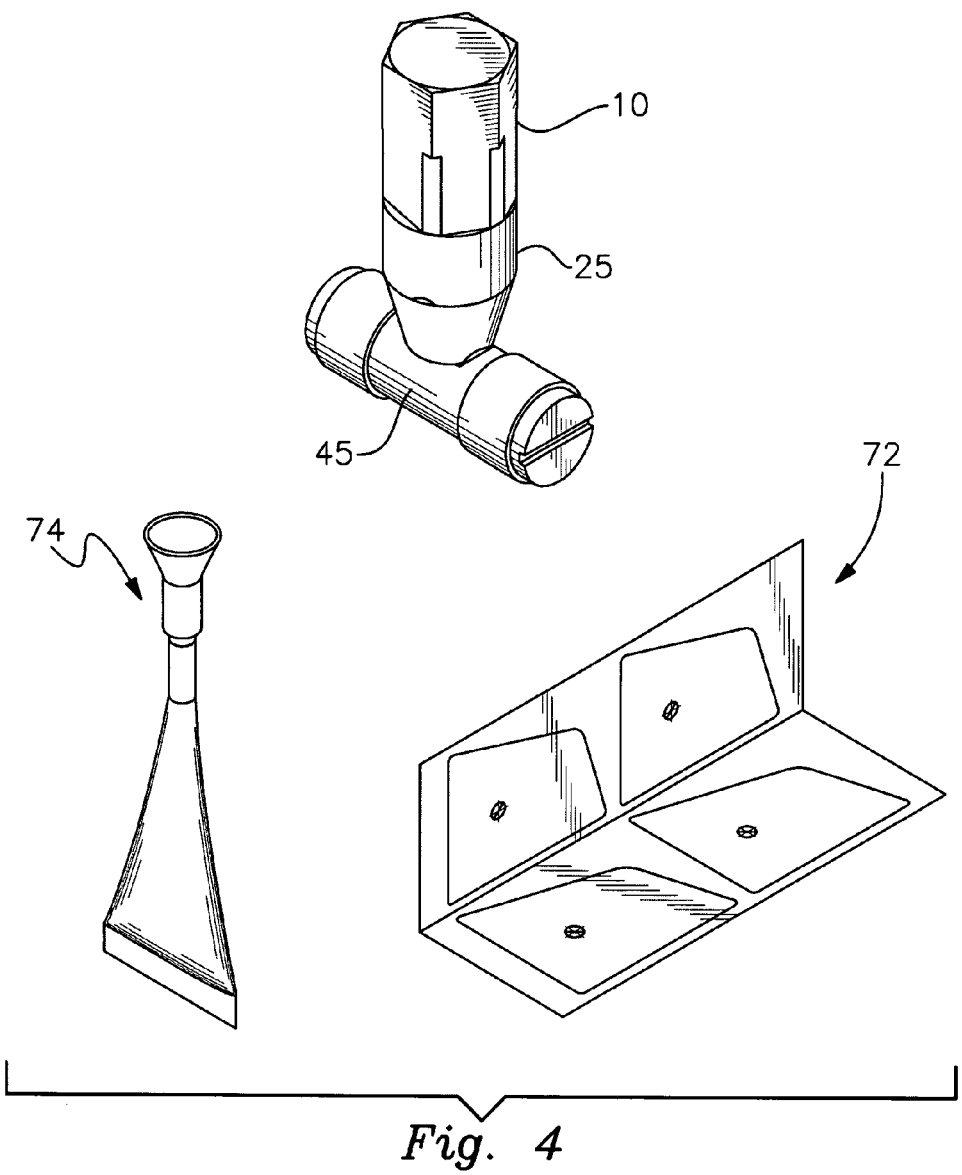
FIG. 4 is a view of an installation kit for the presently claimed invention

The presently claimed invention includes an installation kit. In addition to the lock, the kit has a pattern 72; and threadlocker 222MS 74, a product of the Loctite Corporation of Rocky Hill Conn., USA. The kit is illustrated in FIG. 4. The user supplies the safety goggles, drill, the drill bit, a torque wrench, and a flat head screwdriver.

To install and use the presently claimed invention, a user first affixes a pattern 72 to the side of the housing unit 102. The pattern 72 is particular to the type of outboard motor 120, so a user must select the appropriate pattern. An "x" on the pattern 72 is aligned with an access hole 106 on the housing unit 102. In normal operation, the access hole 106 has a cap 110, to prevent dirt and water from entering the housing 102. The cap 110 easily pops out.

Next, a user drills a hole through both sides of the housing unit 102 at the "x" mark, thereby creating two shaft holes 108. Safety goggles, or glasses should be worn when drilling The bushings 60 are coated with threadlocker 74, and inserted into each of the two shaft holes 108 on the housing-unit 102. The shaft 45 is inserted through the shaft holes 108 via the bushings 60. The shaft 45 is rotated so that the interior plane 56 is facing the access hole 106 in the housing-unit 102. This can be accomplished by inserting a flat head screwdriver into the end face slot 54 and turning in either direction.

Now, the locking pin assembly 25 is placed through the access hole 106, whereby the smooth section 44 of the pin penetrates the threaded hole 58. The threads of the pin 40 can be coated with threadlocker 74. The dowels 20 of the key 10 are inserted into the dowel receiving holes 32 of the locking pin assembly 25, whereby the dowel receiving face 30 is flush with the interior face 22 of the key 10. Finally, the key 10 is tightened until the narrow end of the conical section 36 is flush with the interior plane 56. The user removes the key 10, placing it in a safe place for future use and the cap 110 placed back on the access hole 106. The locking pin 25, with the help of gravity, rotates around and below the shaft 45, thereby obstructing the bolt securing the lower-unit 104 to the housing unit 102, and preventing the unauthorized removal of the lower-unit 104. In one particular embodiment, the key 10, and consequently the locking pin assembly 25 is tightened to between fifteen to twenty pounds of torque.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A lock in combination with a boat motor comprising:
   a boat motor, having a lower-unit secured to a housing-unit, via a bolt placed through an access hole on the housing unit, and two shaft holes on opposite sides of the housing unit perpendicular to the access hole;
   a locking pin assembly, having
      a dowel receiving face with dowel receiving holes defined therein,
      a cylindrical section perpendicular and abutting the dowel receiving face,
      a conical section having narrow and wide ends, the wide end of the conical section abutting the cylindrical section at an end of the cylindrical section opposite from the dowel receiving face, and
      a pin at the narrow end of the conical section, the pin having a threaded section proximal to the narrow end and a smooth section distal to the narrow end;
   a cylindrical shaft, having
      a shaft side the length of the shaft,
      end faces at the ends of the shaft,
      an end face slot defined in at least on of the end faces,
      a threaded hole for receiving the pin,
      an interior plane defined in the shaft side around the threaded hole, whereby the narrow end of the conical section is flush with the interior plane when the pin is fully inserted into the threaded hole and the cylindrical shaft is flush with the two shaft holes of the housing unit; and
   a key having
      an exterior face,
      a plurality of planar major sides, perpendicular to the exterior face,
      a plurality of edges, generally half the length of the major sides, proximal to the exterior face, the edges defined by the abutment of the major sides;

a plurality of planar minor sides, generally half the length of the major sides, distal to the exterior face and centered next to the edges, the minor sides alternate, thereby connecting the major sides, an interior face perpendicular to the major and minor sides and parallel to the exterior face, and a plurality of dowels on the interior face, whereby the interior face is flush with the dowel receiving face when the dowels are inserted into the dowel receiving holes.

2. The combination of claim 1, wherein the exterior face of the key is hexagonal in shape, allowing the key to fit a socket wrench.

3. The combination of claim 2, wherein the key is brass.

4. The combination of claim 1, wherein the locking pin assembly and cylindrical shaft are made of steel.

5. The combination of claim 1, further comprising a bushing on either side of the interior plane of the cylindrical shaft, the bushing separating the shaft side from the interior of holes drilled in the housing unit.

6. A method of installing the lock of claim 5, comprising the steps of:

Providing the lock of claim 5;

Providing a housing-unit of an outboard motor;

Affixing a pattern to the side of the housing unit, whereby an "x" on the pattern is aligned with a top hole on the housing unit;

Drilling a hole through both sides of the housing unit at the "x" mark;

inserting the bushings into each of the two drilled holes on the housing-unit;

inserting the shaft through the drilled holes via the bushings;

rotating the shaft so that the interior plane is facing an access hole in the housing-unit;

inserting the locking pin assembly through the access hole, whereby the smooth section of the pin penetrates the threaded hole;

inserting the dowels of the key into the dowel receiving holes locking pin assembly, whereby the dowel receiving face is flush with the interior face of the key; and tightening the key until the narrow end of the conical section is flush with the interior plane.

7. The method of claim 6, wherein the key is tightened to between fifteen and twenty pounds of torque.

8. The method of claim 6, further comprising coating the bushings with threadlocker.

9. The method of claim 6, further comprising coating the threads of the pin with threadlocker.

10. A kit for installing the lock of claim 5, comprising:

the lock of claim 5, a pattern; and threadlocker.

* * * * *